(12) United States Patent
Zhang et al.

(10) Patent No.: US 12,342,109 B2
(45) Date of Patent: Jun. 24, 2025

(54) DATA TRANSMITTING METHOD AND APPARATUS, DATA RECEIVING METHOD AND APPARATUS, COMMUNICATION NODE, AND STORAGE MEDIUM

(71) Applicant: ZTE CORPORATION, Guangdong (CN)

(72) Inventors: Weiliang Zhang, Guangdong (CN); Liquan Yuan, Guangdong (CN); Yong Guo, Guangdong (CN); Jun Shan Wey, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 430 days.

(21) Appl. No.: 17/771,609

(22) PCT Filed: Oct. 19, 2020

(86) PCT No.: PCT/CN2020/121880
§ 371 (c)(1),
(2) Date: Apr. 25, 2022

(87) PCT Pub. No.: WO2021/078093
PCT Pub. Date: Apr. 29, 2021

(65) Prior Publication Data
US 2022/0377439 A1    Nov. 24, 2022

(30) Foreign Application Priority Data
Oct. 25, 2019  (CN) .......................... 201911025039.8

(51) Int. Cl.
*H04Q 11/00*  (2006.01)

(52) U.S. Cl.
CPC ......... *H04Q 11/00* (2013.01); *H04Q 11/0003* (2013.01); *H04Q 11/0062* (2013.01); *H04Q 2011/0088* (2013.01)

(58) Field of Classification Search
None
See application file for complete search history.

(56) References Cited

U.S. PATENT DOCUMENTS

2004/0092276 A1\* 5/2004 Dooley .................. H04B 7/022
                                                                   455/445
2011/0305458 A1\* 12/2011 Zhou ..................... H04J 3/1605
                                                                   398/66

(Continued)

FOREIGN PATENT DOCUMENTS

CN    101815229 A    8/2010
CN    102026045 A    4/2011

(Continued)

OTHER PUBLICATIONS

WIPO, International Search Report issued on Jan. 14, 2021.

(Continued)

*Primary Examiner* — Benjamin Lamont
(74) *Attorney, Agent, or Firm* — Li & Cai Intellectual Property (USA) Office

(57) ABSTRACT

The present application provides a data transmitting method, a data transmitting apparatus, a data receiving method, a data receiving apparatus, a communication node and a storage medium. The data transmitting apparatus includes: converting a data frame to be transmitted into a data frame group; encapsulating the data frame group to obtain an encapsulated frame; and transmitting the encapsulated frame.

7 Claims, 4 Drawing Sheets

(56) References Cited

U.S. PATENT DOCUMENTS

| | | | | |
|---|---|---|---|---|
| 2013/0077961 A1* | 3/2013 | Dvir | .................... | H04B 10/071 |
| | | | | 398/16 |
| 2017/0012731 A1 | 1/2017 | Luo et al. | | |
| 2017/0155983 A1* | 6/2017 | Detwiler | ................ | H04B 10/27 |
| 2018/0077475 A1* | 3/2018 | Ye | ..................... | H04Q 11/0005 |
| 2021/0152249 A1* | 5/2021 | Gao | ....................... | H04B 10/60 |

FOREIGN PATENT DOCUMENTS

| | | |
|---|---|---|
| CN | 102118216 A | 7/2011 |
| CN | 107735988 A | 2/2018 |
| KR | 20070061064 A | 6/2007 |
| WO | WO2013046047 A1 | 4/2013 |
| WO | WO2017095749 A1 | 6/2017 |
| WO | WO2020057187 A1 | 3/2020 |

OTHER PUBLICATIONS

China Patent Office, First office action dated Sep. 26, 2023, for corresponding CN application No. 201911025039.8.

European Patent Office, the Extended European Search Report dated Oct. 4, 2023, for corresponding EP application No. 20879403.2.

Denis Khotimsky Motorola USA Yuanqiu Luo Huawei Technologies China Hiroaki Mukai Mitsubishi Japan: "XG-PON Transmission Convergence layer specification (for last call); 272 Rev. 3(PLEN/15)", ITU-T Draft, Jun. 24, 2010.

\* cited by examiner

DATA TRANSMITTING METHOD AND APPARATUS, DATA RECEIVING METHOD AND APPARATUS, COMMUNICATION NODE, AND STORAGE MEDIUM

The present application claims priority to the Chinese Patent Application No. 201911025039.8 filed with the Chinese Patent Office on Oct. 25, 2019, the entire contents of which are incorporated herein by reference.

TECHNICAL FIELD

The present application relates to passive optical networks, and in particular, to a data transmitting method, a data transmitting apparatus, a data receiving method, a data receiving apparatus, a communication node and a storage medium.

BACKGROUND

In a passive optical network (PON) standard of an International Telecommunications Union Telecommunications Standardization group (ITU-T), one data frame is mapped into one G-PON/XG-PON Encapsulation Method (GEM/XGEM) frame for transmission. Taking an XGEM frame as an example, in a case where a data frame to be transmitted has a relatively short length, a frame header of the XGEM frame accounts for a relatively large proportion, while a payload of the XGEM frame accounts for a relatively small proportion, and a bandwidth utilization is relatively low. In response to multi-channel bonding, the frame header of the XGEM frame is inserted to each channel, and a problem of relatively low bandwidth utilization is even more serious.

SUMMARY

The present application provides a data transmitting method, a data transmitting apparatus, a data receiving method, a data receiving apparatus, a communication node and a storage medium, so as to increase a proportion of data frames and increase a bandwidth utilization.

An embodiment of the present application provides a data transmitting method, including:
converting a data frame to be transmitted into a data frame group;
encapsulating the data frame group to obtain an encapsulated frame; and
transmitting the encapsulated frame.

An embodiment of the present application further provides a data receiving method, including:
receiving an encapsulated frame;
acquiring a data frame group according to the encapsulated frame; and
converting the data frame group into a target data frame.

An embodiment of the present application further provides a data transmitting apparatus, including:
a first conversion module configured to convert a data frame to be transmitted into a data frame group;
an encapsulation module configured to encapsulate the data frame group to obtain an encapsulated frame; and
a transmission module configured to transmit the encapsulated frame.

An embodiment of the present application further provides a data receiving apparatus, including:
a receiving module configured to receive an encapsulated frame;
a decapsulation module configured to acquire a data frame group according to the encapsulated frame; and
a second conversion module configured to convert the data frame group into a target data frame.

An embodiment of the present application further provides a communication node, including:
one or more processors; and
a storage device configured to store one or more computer programs;
the one or more computer programs, when executed by the one or more processors, cause the one or more processors to implement the data transmitting method or the data receiving method described above.

An embodiment of the present application further provides a computer-readable storage medium having a computer program stored therein, the computer program, when executed by a processor, performs the data transmitting method or the data receiving method described above.

DETAIL DESCRIPTION OF EMBODIMENTS

The present application is described below with reference to the accompanying drawings and the embodiments. The embodiments described herein are merely intended to explain the present application, rather than limiting the present application. It should be noted that the embodiments in the present application and the characteristics in the embodiments may be combined with each other if no conflict is incurred. For purposes of illustration, accompanying drawings illustrate only part of structures related to the present application, but not all structures.

Figure 1:
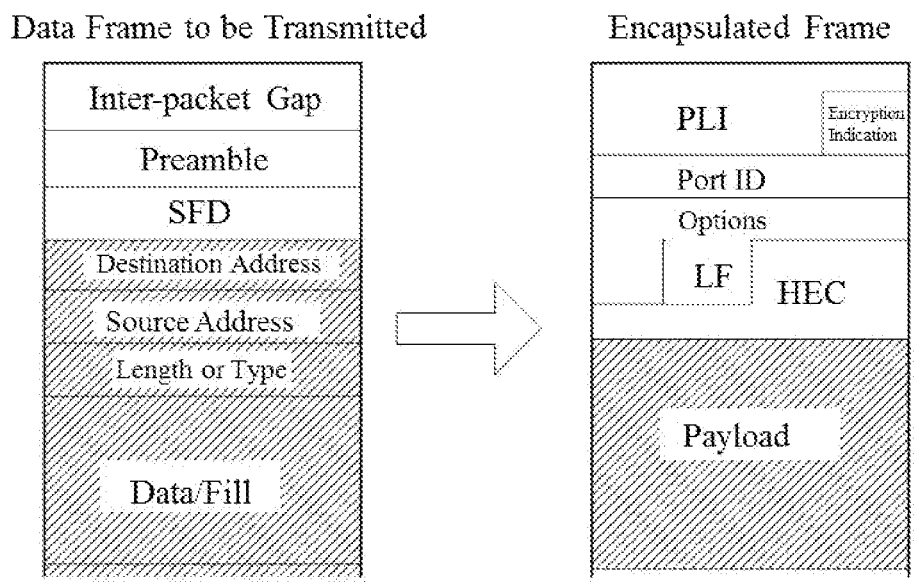
FIG. 1 is a diagram of encapsulating a data frame to be transmitted.

In the passive optical network (PON) standard of the International Telecommunications Union Telecommunications Standardization group (ITU-T), one data frame is mapped into one G-PON/XG-PON Encapsulation Method (GEM/XGEM) frame for transmission. FIG. 1 is a diagram of encapsulating a data frame to be transmitted. A process of encapsulating a data frame to be transmitted is a process of mapping partial contents (a shaded portion shown in FIG. 1) of one data frame to be transmitted into partial fields of one encapsulated frame, for example, one Ethernet medium access control (MAC) frame is mapped into one GEM/XGEM frame, in a case where a data frame to be transmitted has a relatively short length, a frame header of the XGEM frame accounts for a relatively large proportion (8 bits), while a payload of the XGEM frame accounts for a relatively small proportion, and a bandwidth utilization is relatively low. In response to multi-channel bonding, the frame header of the XGEM frame is inserted to each channel, and a problem of relatively low bandwidth utilization is even more serious. It can be seen that, in the existing art, each data frame is transmitted after being encapsulated, and an encapsulating cost is relatively large, an effective data accounts for a relatively small proportion, and the bandwidth utilization is relatively low.

According to the present application, there is provided a data transmitting method, the data transmitting method encapsulates and transmits an entire data frame group through converting a data frame to be transmitted into the data frame group, a cost of frame header in a process of encapsulating is reduced, a proportion of the data frame to be transmitted in an encapsulated frame is increased, and thus a bandwidth utilization in a data transmitting process is increased. The data transmitting method may be applied to a data transmitting terminal in a PON, the PON is composed by one optical line terminal (OLT) being connected with multiple optical network units (ONU) through a point-to-multipoint optical distribution network (ODN). The data transmitting terminal may be the OLT or the ONU.

Figure 2:
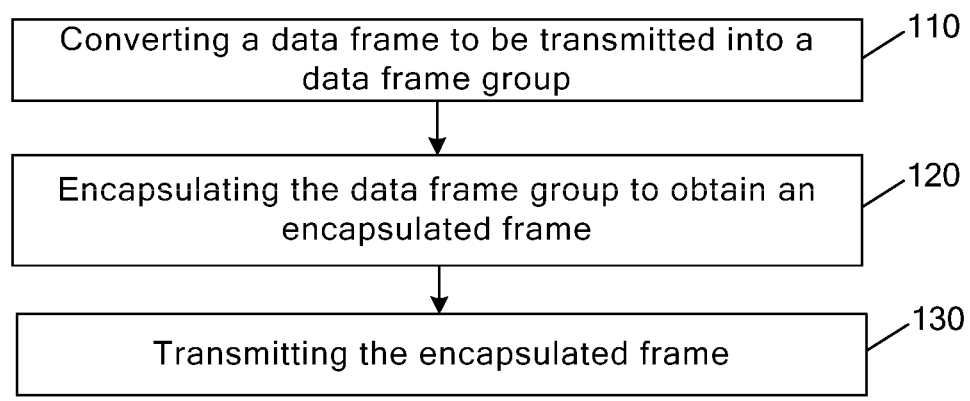
FIG. 2 is a flowchart of a data transmitting method according to the present application.

FIG. 2 is a flowchart of a data transmitting method according to the present application. As shown in FIG. 2, the data transmitting method includes operation 110, operation 120 and operation 130.

At operation 110, converting a data frame to be transmitted into a data frame group.

At operation 120, encapsulating the data frame group to obtain an encapsulated frame.

At operation 130, transmitting the encapsulated frame.

In the present application, the data frame to be transmitted may be an Ethernet MAC frame. A process of converting the data frame to be transmitted into the data frame group may be understood as splicing the data frame to be transmitted into one data frame group, and in the process of splicing, each data frame to be transmitted corresponds to a corresponding delineation field for indicating a length of the corresponding data frame to be transmitted, so that a data receiving terminal can identify the data frame group according to all delineation fields and then desplice the data frame group to obtain each independent data frame. A process of encapsulating the data frame group may be understood as adding a frame header to the data frame group for forming a complete encapsulated frame, the frame header may include information for indicating a length of the entire data frame group, and may further include information for indicating a length of a specific data frame to be transmitted (e.g., a first data frame to be transmitted). After that the data frame to be transmitted is converted into the data frame group, the encapsulation for the data frame group can be implemented by using only one frame header, thus, a proportion of the frame header in the encapsulated frame is effectively reduced, a proportion of the data frame to be transmitted in the encapsulated frame is increased, so that a bandwidth utilization in a process of data transmitting is increased. It should be noted that the operations of converting, encapsulating and transmitting in the present application are applicable to cases where one or more data frames are to be transmitted.

In some implementations, in the data frame group, in front of each data frame to be transmitted, a delineation field is added, and the delineation field is used to indicate a length of each data frame to be transmitted.

Figure 3:
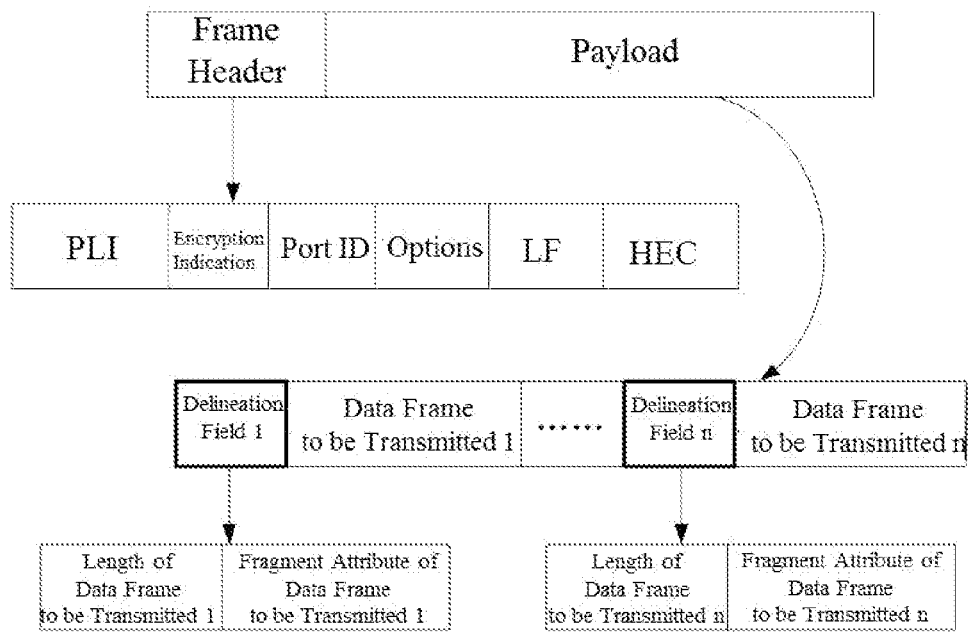
FIG. 3 is a diagram of an encapsulated frame according to the present application.

FIG. 3 is a diagram of an encapsulated frame according to the present application. As shown in FIG. 3, each encapsulated frame includes two parts: a frame header and a payload, for example, the frame header includes fields of a payload length indication, an encryption indication, a port identification (ID) and the like, in the present application, the payload mainly refers to the data frame group converted from the data frame to be transmitted. In a process of splicing, in front of each data frame to be transmitted, a delineation field is added for indicating a length of the corresponding data frame to be transmitted, then data frames to be transmitted are spliced together successively according to the sequence of a delineation field 1, a data frame 1 to be transmitted, a delineation field 2, a data frame 2 to be transmitted, . . . , a delineation field n, a data frame n to be transmitted, so that the data frames to be transmitted are converted into the data frame group. It should be noted that, if there is only one data frame to be transmitted, the data frame to be transmitted and a delineation field corresponding to the data frame to be transmitted may form a data frame group.

In some implementations, in response to that the data frame to be transmitted is a data frame fragment, the delineation field is further used to indicate a fragment attribute of the corresponding data frame to be transmitted, the fragment attribute is used to indicate that the corresponding data frame to be transmitted is a last fragment or the corresponding data frame to be transmitted is not the last fragment.

In some implementations, the data frame to be transmitted is the data frame fragment in response to at least one of followings: a length of the data frame to be transmitted is greater than a maximum length indicated by a delineation field corresponding to the data frame to be transmitted; or the data frame to be transmitted cannot be transmitted as a whole.

In the present application, the delineation field includes an indication field for indicating a length of a data frame to be transmitted corresponding to the indication field, since the length indicated by the indication field may be limited, or a total length of a spliced data frame group indicated by a Payload Length Indicator (PLI) in a frame header of an encapsulated frame may be limited, the data frame to be transmitted may be expected to be divided into a plurality of data frame fragments for transmission, and the plurality of data frame fragments compose the complete data frame to be transmitted. In the present application, the delineation field further includes an indication field for indicating a fragment attribute of a data frame to be transmitted corresponding to the indication field, so as to indicate whether the data frame to be transmitted is a last fragment, as shown in FIG. 3. For example, for a MAC frame, the delineation field includes an indication field for indicating a MAC frame length (MFL), and for a MAC frame fragment, the delineation field further includes an indication field for indicating a fragment attribute (such as a last fragment (LF) field). In addition, the delineation field may further include a hybrid error correction (HEC) field.

For example, the delineation field may include a length indication field (14 bits), an indication field for indicating a fragment attribute (1 bit), a reserved field (4 bits) and a HEC field (13 bits); or the delineation field may include a length indication field (10 bits), an indication field for indicating a fragment attribute (1 bit) and a HEC field (13 bits).

In some implementations, the encapsulating the data frame group further includes: encapsulating a delineation field corresponding to a first data frame to be transmitted in the data frame group into a frame header of the encapsulated frame; and a length of the data frame group indicated by the frame header of the encapsulated frame excludes a length of the delineation field corresponding to the first data frame to be transmitted.

Figure 4:
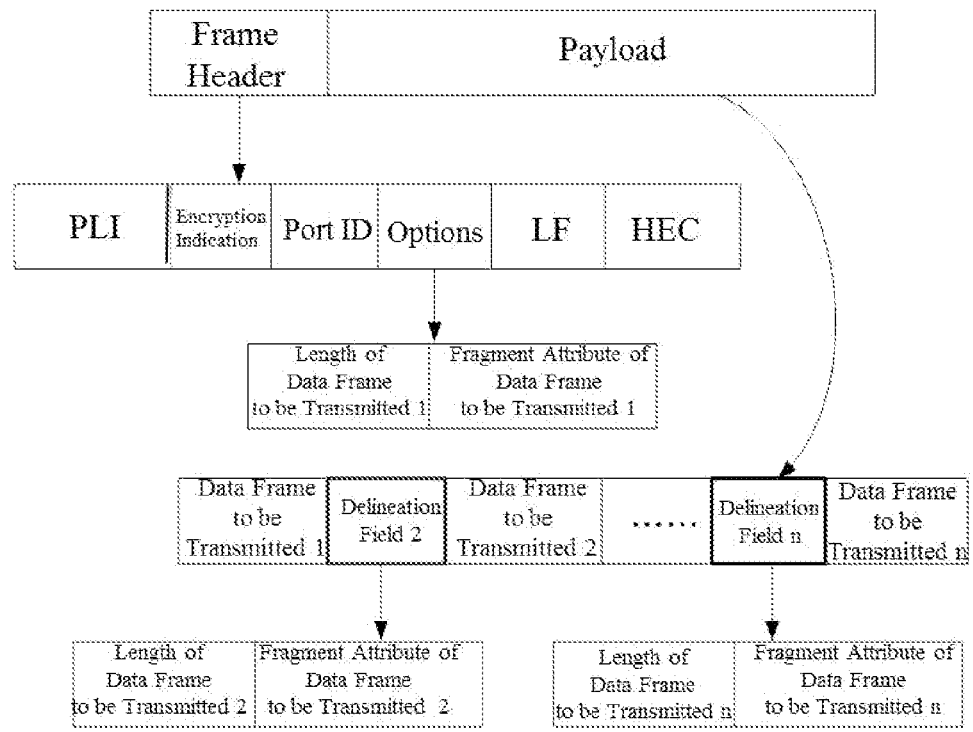
FIG. 4 is a diagram of an encapsulated frame according to the present application.

FIG. 4 is a diagram of an encapsulated frame according to the present application. As shown in FIG. 4, in a process of splicing, a corresponding delineation field is added in front of each other data frame to be transmitted, except for the first data frame to be transmitted, for indicating a length of the corresponding data frame to be transmitted, then the data frames to be transmitted are spliced together successively according to the sequence of a delineation field 1, a data frame 1 to be transmitted, a delineation field 2, a data frame 2 to be transmitted, . . . , a delineation field n, a data frame n to be transmitted, so that the data frames to be transmitted are converted into the data frame group, and thus the data frame group is a payload of the encapsulated frame. In the present application, the data frame group excludes the delineation field corresponding to the first data frame to be transmitted, the delineation field corresponding to the first data frame to be transmitted is included in the frame header of the encapsulated frame, for example, the delineation field corresponding to the first data frame to be transmitted may be encapsulated in Options field of the frame header of the encapsulated frame.

In some implementations, the encapsulating the data frame group includes: indicating a length of the data frame group in the frame header of the encapsulated frame.

In the present application, the length of a data frame group is indicated by the frame header of the encapsulated frame.

Figure 5:
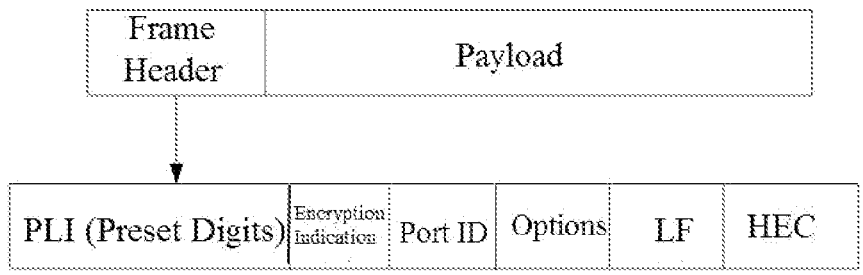
FIG. 5 is a diagram of an encapsulated frame according to the present application.

FIG. 5 is a diagram of an encapsulated frame according to the present application. In a process of converting and encapsulating, a corresponding delineation field is added in front of each data frame to be transmitted in the data frame group (the delineation field corresponding to the first data frame to be transmitted may be included in the frame header of the encapsulated frame), and a length of payload of the encapsulated frame is substantially increased. In the present application, the PLI of the frame header of the encapsulated frame is extended. For example, in a case where each data frame to be transmitted is encapsulated and transmitted individually, the PLI has a length of 14 bits, i.e., $2^{14}=16384$ bytes, and the Options field has a length of 18 bits. In the present application, the delineation field corresponding to the first data frame to be transmitted may occupy (14+1) bits in the Options field, and other 3 bits in the Options field may be extended into the PLI, so that the PLI is extended to 17 bits, i.e., $2^{17}=131072$ bytes, thereby a length of the data frame group is extended, and more data frames to be transmitted can be encapsulated in one encapsulated frame.

The data transmitting method according to the present application encapsulates and transmits an entire data frame group through converting a data frame to be transmitted into the data frame group, a cost of frame header in a process of encapsulating is reduced, a proportion of the data frame to be transmitted in an encapsulated frame is increased, and thus a bandwidth utilization in a data transmitting process is increased.

Figure 6:
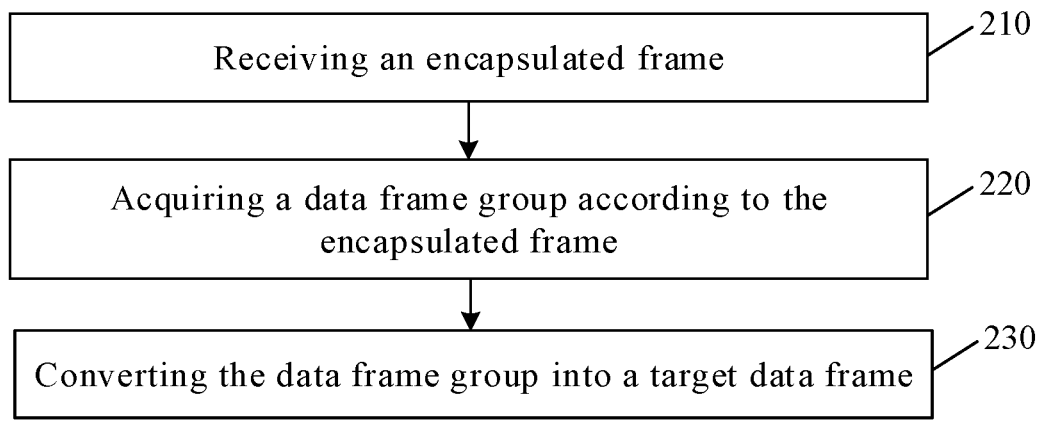
FIG. 6 is a flowchart of a data receiving method according to the present application.

According to the present application, there is further provided a data receiving method. The data receiving method is applied to a data receiving terminal, and the data receiving terminal may be an OLT or an ONU. FIG. 6 is a flowchart of a data receiving method according to the present application, and as shown in FIG. 6, the data receiving method includes operation 210, operation 220 and operation 230.

At operation 210, receiving an encapsulated frame.

At operation 220, acquiring a data frame group according to the encapsulated frame.

At operation 230, converting the data frame group into a target data frame.

In the present application, the target data frame is a data frame obtained by decapsulating and converting a received encapsulated frame, and the target data frame corresponds to a data frame to be transmitted at a transmitting terminal. Taking that the target data frame is a MAC frame as an example, the encapsulated frame includes a frame header and a data frame group, the frame header may include information for indicating a length of the entire data frame group, and may further include information for indicating a length of a specific data frame in the data frame group; and the data frame group is formed by the target data frame. A process of converting the data frame group into the target data frame may be understood as desplicing the data frame group to obtain each independent target data frame. Each target data frame in the data frame group corresponds to one delineation field for indicating a length of the target data frame, and each target data frame may be obtained by desplicing the data frame group according to the delineation field corresponding to each target data frame. The data receiving method according to the present application encapsulates all (one or more) target data frames into the same encapsulated frame, a relatively low encapsulating cost and a relatively large proportion of the data frame are utilized for implementing data transmitting, so that a bandwidth utilization in a process of data transmitting is increased.

In some implementations, the converting the data frame group into the target data frame includes: determining the target data frame individually according to the delineation field in the data frame group.

In the present application, a corresponding delineation field is added in front of a data frame to be transmitted (i.e., target data frame) before data transmission, for converting the data frame to be transmitted (i.e., target data frame) into a data frame group, each target data frame may be obtained by desplicing the data frame group according to the delineation field corresponding to each target data frame; if there is only one target data frame, the data frame except for the delineation field in the data frame group is the target data frame.

In some implementations, the determining the target data frame individually according to the delineation field in the data frame group includes: acquiring the delineation field in the data frame group individually; and determining the target data frame corresponding to each delineation field from the data frame group according to a length of the target data frame indicated by each delineation field in the data frame group.

Referring to the structure of the data frame group shown in FIG. 3, in the present application, the delineation field in the data frame group is acquired individually, and for each delineation field, the data frame, which is located after the delineation field and has a same length indicated by the delineation field, is the target data frame corresponding to the delineation field.

In some implementations, in a case where the target data frame is a data frame fragment, and a fragment attribute of the data frame fragment indicated by the delineation field indicates that the data frame fragment is not a last fragment, storing the data frame fragment indicated by the delineation field temporarily; and in a case where a fragment attribute of the data frame fragment indicated by the delineation field indicates that the data frame fragment is the last fragment, assembling a stored data frame fragment and the data frame fragment being indicated as the last fragment successively to obtain the target data frame.

Referring to the structure of the data frame group shown in FIG. 3, in the present application, the delineation field in the data frame group is acquired individually, and for each delineation field, all data frame fragments, from the data frame fragment corresponding to the delineation field, till the data frame fragment being indicated as the last fragment, constitute the target data frame.

In some implementations, the acquiring the data frame group according to the encapsulated frame includes: determining a length of the data frame group according to a frame header of the encapsulated frame; and extracting the data frame group from the encapsulated frame according to the length of the data frame group. In the present application, the frame header of the encapsulated frame indicates the length of the data frame group, so that the receiving terminal can extract the data frame group according to the indicated length of the data frame group. For example, the length of the data frame group may be indicated by the PLI of the frame header of the encapsulated frame.

In some implementations, the delineation field in the frame header of the encapsulated frame is acquired as a delineation field corresponding to a first target data frame in the data frame group.

In the present application, the frame header of the encapsulated frame includes a delineation field for indicating a length of a first target data frame in the data frame group, or indicating a fragment attribute of the first target data frame in the data frame group.

The data receiving method according to the present application converts a data frame group into a target data frame through extracting the data frame group from the encapsulated frame, so that a relatively low encapsulating cost and a relatively large proportion of the data frame is utilized for implementing data transmitting, and thus a bandwidth utilization in a process of data transmitting is increased.

Figure 7:
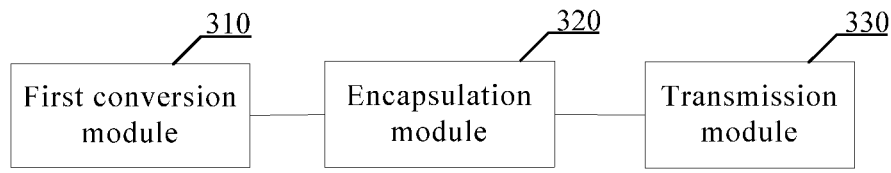
FIG. 7 is a structural diagram of a data transmitting apparatus according to the present application.

According to the present application, there is further provided a data transmitting apparatus. FIG. 7 is a structural diagram of a data transmitting apparatus according to the present application. As shown in FIG. 7, the data transmitting apparatus includes a first conversion module 310, an encapsulation module 320 and a transmission module 330.

The first conversion module 310 is configured to convert a data frame to be transmitted into a data frame group; the encapsulation module 320 is configured to encapsulate the data frame group to obtain an encapsulated frame; and the transmission module 330 is configured to transmit the encapsulated frame.

The data transmitting apparatus according to the present application encapsulates and transmits an entire data frame group through converting the data frame to be transmitted into the data frame group, a cost of frame header in a process of encapsulating is reduced, a proportion of the data frame to be transmitted in the encapsulated frame is increased, and thus a bandwidth utilization in a data transmitting process is increased.

In some implementations, in the data frame group, in front of each data frame to be transmitted, a delineation field is added, and the delineation field is used to indicate a length of each data frame to be transmitted.

In some implementations, in response to that the data frame to be transmitted is a data frame fragment, the delineation field is further used to indicate a fragment attribute of the corresponding data frame to be transmitted, the fragment attribute is used to indicate that the corresponding data frame to be transmitted is a last fragment or the corresponding data frame to be transmitted is not the last fragment.

In some implementations, the data frame to be transmitted is the data frame fragment in response to at least one of followings: a length of the data frame to be transmitted is greater than a maximum length indicated by the delineation field corresponding to the data frame to be transmitted; or the data frame to be transmitted cannot be transmitted as a whole.

In some implementations, the encapsulation module 320 is configured to, in a frame header of the encapsulated frame, indicate a length of the data frame group.

In some implementations, the encapsulation module 320 is further configured to encapsulate a delineation field corresponding to a first data frame to be transmitted in the data frame group into the frame header of the encapsulated frame; and a length of the data frame group indicated by the frame header of the encapsulated frame excludes a length of the delineation field corresponding to the first data frame to be transmitted.

The technical details of the data transmitting apparatus according to the present application, which are not described in detail, may be referred to the data transmitting method according to the present application.

Figure 8:
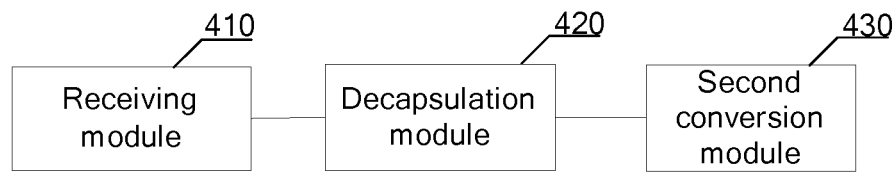
FIG. 8 is a structural diagram of a data receiving apparatus according to the present application.

According to the present application, there is further provided a data receiving apparatus. FIG. 8 is a structural diagram of a data receiving apparatus according to the present application. As shown in FIG. 8, the receiving apparatus includes a receiving module 410, a decapsulation module 420 and a second conversion module 430.

The receiving module 410 is configured to receive an encapsulated frame; the decapsulation module 420 is configured to acquire a data frame group according to the encapsulated frame; and the second conversion module 430 is configured to convert the data frame group into a target data frame.

The data receiving apparatus according to the present application converts a data frame group into a target data frame through extracting the data frame group from the encapsulated frame, so that a relatively low encapsulating cost and a relatively large proportion of the data frame is utilized for implementing data transmitting, and thus a bandwidth utilization in a process of data transmitting is increased.

In some implementations, the second conversion module 430 is configured to determine the target data frame individually according to the delineation field in the data frame group.

In some implementations, the second conversion module 430 is configured to acquire the delineation field in the data frame group individually; and determine the target data frame corresponding to each delineation field from the data frame group according to a length of the target data frame indicated by each delineation field in the data frame group.

In some implementations, in response to that the target data frame is a data frame fragment, the second conversion module 430 is configured to, in a case where a fragment attribute of the data frame fragment indicated by the delineation field indicates that the data frame fragment is not a last fragment, storing the data frame fragment indicated by the delineation field temporarily; and in a case where a fragment attribute of the data frame fragment indicated by the delineation field indicates that the data frame fragment is the last fragment, assembling a stored data frame fragment and the data frame fragment being indicated as the last fragment successively to obtain the target data frame.

In some implementations, the decapsulation module 420 is configured to determine a length of the data frame group according to the frame header of the encapsulated frame; and extract the data frame group from the encapsulated frame according to the length of the data frame group.

In some implementations, the decapsulation module 420 is configured to acquire the delineation field in the frame header of the encapsulated frame as a delineation field corresponding to a first target data frame in the data frame group.

The technical details of the data receiving apparatus according to the present application, which are not described in detail, may be referred to the data receiving method according to the present application.

According to the present application, there is further provided a communication node. The data transmitting method may be performed by the data transmitting apparatus; the data transmitting apparatus may be implemented by software and/or hardware, and integrated in the communication node. The data receiving method may be performed by the data receiving apparatus; the data receiving apparatus may be implemented by software and/or hardware, and integrated in the communication node. The communication node may be a service node or a terminal.

Figure 9:
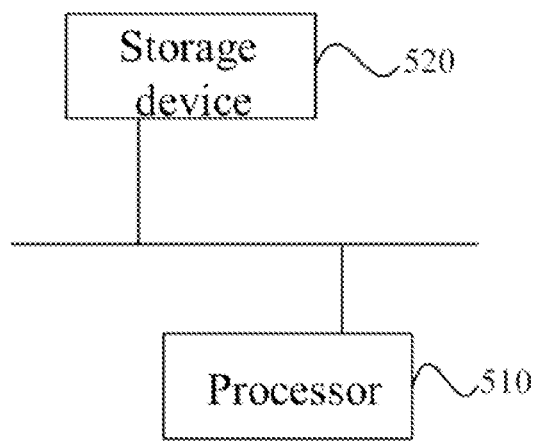
FIG. 9 is a structural diagram of a communication node according to the present application.

FIG. 9 is a structural diagram of a communication node according to the present application. As shown in FIG. 9, the communication node includes a processor 510 and a storage device 520. One or more processors may be included in the communication node, in FIG. 9, one processor 510 is shown as an example, the processor 510 and the storage device 520 in the communication node may be connected by a bus or other methods, and in FIG. 9, a connection through a bus is shown as an example.

One or more computer programs, when executed by the one or more processors 510, cause the one or more processors 510 to implement the data transmitting method or the data receiving method according to the present application.

The storage device 520 in the communication node as a computer-readable storage medium may have one or more computer programs stored therein, the computer programs may be software programs, computer-executable instructions and modules, such as program instructions/modules corresponding to the data transmitting method according to the present application (for example, the data transmitting apparatus shown in FIG. 7 includes the first conversion module 310, the encapsulation module 320 and the transmission module 330). The processor 510 executes software programs, instructions and modules stored in the storage device 520, so as to perform a plurality of functional applications and data processing of the communication node, that is, to implement the data transmitting method or the data receiving method according to the present application.

The storage device 520 mainly includes a storage program area and a storage data area, the storage program area may storage an operating system and an application program for at least one function; the storage data area may storage a data created according to applications of the storage device 520. The storage device 520 may include a high-speed random access memory, or a non-volatile memory, such as at least one magnetic storage device, flash memory, or other non-volatile solid-state memories. In some implementations, the storage device 520 may further include memories configured remotely with respect to the processor 510, and these remote memories may be connected to the communication node over a network. The examples of the network described above include, but are not limited to, the internet, intranets, local area networks, mobile communication networks, and combinations thereof.

The one or more computer programs stored in the above communication node, when executed by the one or more processors, implement following operations: converting a data frame to be transmitted into a data frame group; encapsulating the data frame group to obtain an encapsulated frame; and transmitting the encapsulated frame. Alternatively, following operations are implemented: receiving an encapsulated frame; acquiring a data frame group according to the encapsulated frame; and converting the data frame group into a target data frame.

The technical details of the communication node, which are not described in detail, may be referred to the data transmitting method or the data receiving method according to the present application.

According to the present application, there is further provided a computer-readable storage medium having a computer program stored therein, the computer program, when executed by a processor, performs any of the data transmitting method or the data receiving method.

Through the description above, it is clear to those skilled in the art that the method according to the present application may be implemented by a software plus a general hardware, and certainly may also be implemented by a hardware. The technical solutions of the present application may be embodied in the form of a product of computer software, the product of computer software may be stored in a computer-readable storage medium, such as a floppy disk, a Read-Only Memory (ROM), a Random Access Memory (RAM), a FLASH, an optical disk, a hard disk and the like, and includes a plurality of computer-readable instructions for enabling a computer device (may be a computer, a server, or a network device and the like) to execute the method according to the embodiment of the present application.

The above description is merely a schematic explanation of the present application, rather than limiting the protection scope of the present application.

The block diagram of any logical flowchart in the accompanying drawings of the present application may represent program operations of a computer program; or may represent interconnected logic circuits, modules, and functions; or may represent a combination of program operations and logic circuits, modules, and functions. The computer program may be stored in a storage device. The storage device may have any type suitable for the local technical environment, and may be implemented by using any suitable data storage technology, and includes, but is not limited to, a Random Access Memory (RAM), a Read-Only Memory (ROM), an optical storage device and system (a digital video disc (DVD) or a compact disc (CD)) and the like. The computer-readable storage medium may include a non-transitory storage medium. The processor may be any type suitable for the local technical environment, and includes, but is not limited to, a general computer, a specific computer, a microprocessor, a digital signal processor (DSP), an application specific integrated circuit (ASIC), a field programmable gate array (FPGA), and a processor based on a multi-core processor architecture.

What is claimed is:

1. A data transmitting method, comprising:
converting a data frame to be transmitted into a data frame group;
encapsulating the data frame group to obtain an encapsulated frame; and
transmitting the encapsulated frame;
wherein in the data frame group, in front of each data frame to be transmitted except a first data frame to be transmitted, a delineation field is added, and the delineation field is used to indicate a length of said each data frame to be transmitted;
wherein the encapsulating the data frame group comprises:
encapsulating a delineation field corresponding to the first data frame to be transmitted into a frame header of the encapsulated frame, the delineation field corresponding to the first data frame to be transmitted indicating a length of the first data frame to be transmitted; and
indicating a length of the data frame group in the frame header of the encapsulated frame, the length of the data frame group indicated by the frame header of the encapsulated frame including lengths of all data frames to be transmitted in the data frame group plus a length of the delineation field corresponding to each data frame to be transmitted except the first data frame to be transmitted in the data frame group, and excluding a length of the delineation field corresponding to the first data frame to be transmitted.

2. The method of claim 1, wherein in response to that the data frame to be transmitted is a data frame fragment, the delineation field is further used to indicate a fragment attribute of the corresponding data frame to be transmitted, the fragment attribute is used to indicate that the corresponding data frame to be transmitted is a last fragment or the corresponding data frame to be transmitted is not the last fragment.

3. The method of claim 2, wherein the data frame to be transmitted is the data frame fragment in response to at least one of followings:
a length of the data frame to be transmitted is greater than a maximum length indicated by the delineation field corresponding to the data frame to be transmitted; or
the data frame to be transmitted is to be transmitted not as a whole.

4. A data receiving method, comprising:
receiving an encapsulated frame;
acquiring a data frame group according to the encapsulated frame; and
converting the data frame group into a target data frame;
wherein the acquiring a data frame group according to the encapsulated frame comprises:
determining a length of the data frame group according to a frame header of the encapsulated frame, the length of the data frame group including lengths of all target data frames in the data frame group plus a length of a delineation field in front of each target data frame except a first target data frame in the data frame group, and excluding a length of a delineation field corresponding to the first target data frame in the data frame group; and
extracting the data frame group from the encapsulated frame according to the length of the data frame group;
wherein the converting the data frame group into a target data frame comprises:
determining the target data frame except the first target data frame individually according to the delineation field corresponding to the target data frame in the data frame group;
acquiring a delineation field in the frame header of the encapsulated frame as the delineation field corresponding to the first target data frame in the data frame group, and determining the first target data frame according to the delineation field corresponding to the first target data frame.

5. The method of claim 4, wherein the determining the target data frame except the first target data frame individually according to the delineation field corresponding to the target data frame in the data frame group comprises:
acquiring the delineation field in the data frame group individually; and
determining the target data frame corresponding to each delineation field from the data frame group according to a length of the target data frame indicated by each delineation field in the data frame group.

6. The method of claim 4, wherein in response to that the target data frame is a data frame fragment, the determining the target data frame except the first target data frame individually according to the delineation fields corresponding to the target data frame in the data frame group comprises:
in a case where a fragment attribute of the data frame fragment indicated by the delineation field indicates that the data frame fragment is not a last fragment, storing the data frame fragment indicated by the delineation field temporarily; and
in a case where a fragment attribute of the data frame fragment indicated by the delineation field indicates that the data frame fragment is the last fragment, assembling a stored data frame fragment and the data frame fragment being indicated as the last fragment successively to obtain the target data frame.

7. A data receiving method, comprising:
receiving an encapsulated frame;
acquiring a data frame group according to the encapsulated frame; and
converting the data frame group into a target data frame,
wherein the converting the data frame group into a target data frame comprises:
determining the target data frame individually according to a delineation field in the data frame group,
wherein in response to that the target data frame is a data frame fragment, the determining the target data frame individually according to a delineation fields in the data frame group comprises:
in a case where a fragment attribute of the data frame fragment indicated by the delineation field indicates that the data frame fragment is not a last fragment, storing the data frame fragment indicated by the delineation field temporarily; and
in a case where a fragment attribute of the data frame fragment indicated by the delineation field indicates that the data frame fragment is the last fragment, assembling a stored data frame fragment and the data frame fragment being indicated as the last fragment successively to obtain the target data frame.

* * * * *